(12) United States Patent
Terzini (10) Patent No.: US 9,844,846 B2
(45) Date of Patent: Dec. 19, 2017

(54) CONTAINER CARRIER

(71) Applicant: Tension International, Inc., Kansas City, MO (US)

(72) Inventor: Robert Terzini, Corinth, TX (US)

(73) Assignee: TENSION INTERNATIONAL, INC., Kansas City, MO (US)

( * ) Notice: Subject to any disclaimer, the term of this patent is extended or adjusted under 35 U.S.C. 154(b) by 441 days.

(21) Appl. No.: 13/763,339

(22) Filed: Feb. 8, 2013

(65) Prior Publication Data

US 2013/0214469 A1    Aug. 22, 2013

Related U.S. Application Data

(60) Provisional application No. 61/596,697, filed on Feb. 8, 2012.

(51) Int. Cl.

| | |
|---|---|
| *B65G 17/12* | (2006.01) |
| *B23Q 1/03* | (2006.01) |
| *B65B 43/42* | (2006.01) |
| *B65B 43/52* | (2006.01) |
| *B67C 3/24* | (2006.01) |

(52) U.S. Cl.
CPC .............. *B23Q 1/032* (2013.01); *B65B 43/42* (2013.01); *B65B 43/52* (2013.01); *B67C 3/24* (2013.01); *B65G 17/12* (2013.01); *B65G 2201/0261* (2013.01)

(58) Field of Classification Search
CPC ............................................ B65G 2201/0244
USPC .............. 198/867.11, 867.01, 803.3, 803.14; 269/287, 289 R, 55, 297, 309, 314–315, 269/319
See application file for complete search history.

(56) References Cited

U.S. PATENT DOCUMENTS

| | | | |
|---|---|---|---|
| 3,860,107 A | | 1/1975 | Cioni et al. |
| 3,941,237 A | * | 3/1976 | MacGregor, Jr. ......... 198/867.13 |
| 4,456,447 A | * | 6/1984 | Smith ........................... 425/182 |
| 4,747,507 A | * | 5/1988 | Fitzgerald et al. ........... 220/739 |
| 4,865,090 A | * | 9/1989 | Burolla et al. ................ 141/165 |
| 5,255,776 A | * | 10/1993 | Grecksch et al. .......... 198/465.1 |

(Continued)

FOREIGN PATENT DOCUMENTS

WO    WO2011028166    *   3/2011    ............... 198/867.01

*Primary Examiner* — Joseph J Hail
*Assistant Examiner* — J Stephen Taylor
(74) *Attorney, Agent, or Firm* — Polsinelli PC; Marcia J. Rodgers; Joshua J. Pranckun (57) ABSTRACT

A carrier for receiving and restraining a container against rotation during an automated filling and capping operation includes an array of modular container housings. A bumper is disposed below the housing and projects outwardly to cushion the carrier against impact. The bumper is supported by a base. Structure extends from the housing through the bumper and into the base to secure the carrier. One housing module includes a recess having container abutment surfaces and angled surfaces at the opening to guide a container into engagement with the abutments. One housing module includes a recess having ribs separated by relief vents to relieve air pressure as a container is loaded into the carrier. One housing module includes a container holder having a pair of upright supports separated by side openings. The bumper and the base each including a weight positioned at a selected location to uphold the filled container.

23 Claims, 6 Drawing Sheets

(56) References Cited

U.S. PATENT DOCUMENTS

| | | | |
|---|---|---|---|
| 5,373,934 A * | 12/1994 | Jackson et al. | 198/803.8 |
| 5,484,052 A | 1/1996 | Pawloski | |
| 5,579,695 A * | 12/1996 | Cockayne | 104/140 |
| 5,687,874 A * | 11/1997 | Omori et al. | 220/737 |
| 5,769,203 A | 6/1998 | Marti Sala | |
| 5,799,934 A | 9/1998 | Kouda et al. | |
| 5,897,090 A * | 4/1999 | Smith et al. | 248/311.2 |
| 6,068,110 A * | 5/2000 | Kumakiri et al. | 198/803.14 |
| 6,176,369 B1 * | 1/2001 | Petrovic | 198/867.11 |
| 6,311,830 B1 | 11/2001 | Grimm | |
| 6,321,904 B1 * | 11/2001 | Mitchell | 198/867.11 |
| 6,464,100 B2 * | 10/2002 | Canfield | 220/739 |
| 6,490,502 B2 | 12/2002 | Fellows et al. | |
| 6,522,945 B2 * | 2/2003 | Sleep et al. | 700/225 |
| 6,971,506 B2 * | 12/2005 | Hassinen et al. | 198/803.14 |
| 7,040,590 B2 * | 5/2006 | Carnevali | 248/311.2 |
| 7,090,087 B1 * | 8/2006 | Guralski | 215/395 |
| 7,485,264 B2 * | 2/2009 | Itoh | 422/562 |
| 7,708,136 B2 * | 5/2010 | Uriel | 198/803.11 |
| 8,011,166 B2 * | 9/2011 | Sheets et al. | 53/127 |
| 8,047,359 B2 * | 11/2011 | Fellows et al. | 198/867.11 |
| 8,087,528 B1 * | 1/2012 | Scarlett et al. | 220/23.89 |
| 8,132,664 B2 * | 3/2012 | Paskell et al. | 198/803.14 |
| 8,695,791 B2 * | 4/2014 | Ohman | 198/867.01 |
| 8,972,050 B2 * | 3/2015 | Johnson et al. | 700/241 |
| 8,973,745 B2 * | 3/2015 | Scheibenpflug et al. | 198/867.01 |
| 2003/0176942 A1 | 9/2003 | Sleep et al. | |
| 2010/0015007 A1 * | 1/2010 | Pedrazzini | B01L 9/06 422/64 |
| 2010/0294628 A1 * | 11/2010 | Fellows et al. | 198/867.01 |
| 2013/0119596 A1 * | 5/2013 | Balli | 269/287 |

\* cited by examiner

CONTAINER CARRIER

CROSS-REFERENCE TO RELATED APPLICATION

This application claims priority under 35 U.S.C. 119(e) and 37 C.F.R. 1.78(a)(4) based upon U.S. Provisional Application Ser. No. 61/596,697 for CONTAINER HANDLING SYSTEM filed Feb. 8, 2012, the entirety of which is incorporated herein by reference.

FIELD

The present disclosure is broadly concerned with product container carriers. More particularly, it is concerned with a carrier for receiving a container from an assembly line and supporting it in an upright position and secured against rotation for filling and capping.

BACKGROUND

Automated bottling and packaging systems make it possible to handle, fill and cap a wide variety of containers at high speed. These systems may also provide product identification, verification and package labeling. These latter functions enable automated handling systems to be used by regulated industries such as pharmaceutical distribution and dispensing, for example, by mail order pharmacies. In general, these automated systems include structures for loading containers onto a transporting conveyor which delivers them to a series of stations at which they are filled, sealed with a cap or the like, and eventually deposited into a receiving container such as a tote or bin.

The conveyor may be equipped with a series of larger container carriers, or pucks that receive the containers to be filled and support them in an upright position as they are transported along the conveyor. The pucks may be equipped with data elements such as radio frequency identification (RFID) devices or tags having read-write memory. The containers may be labeled with optically readable data such as bar codes. Association of the RFID tag on the puck with the bar code on the container enables computer verification of the contents of the container. In some industries, such as pharmaceutical distribution, the RFID tag may contain both information associated with the bar code on the container as well as information from a stored database regarding the patient and the order number. Where collection totes used in an automated system, they may also include an RFID tag that is associated with the RFID tag on the puck and the bar code on the container. The RFID tag and/or bar code are read along the assembly line and verified by the stored database. If verification of a container fails, it is diverted to a verification station for further processing. Alternatively, it may be shunted to a rejection tote or bin.

The Poison Prevention Packaging Act currently requires prescription pharmaceuticals and medications as well as certain non-prescription drugs, medications, and dietary supplements, household chemical and cosmetic products to be packaged in child-resistant containers unless an exception is claimed. Virtually all such containers employ some form of screw type cap in which threading or one or more radially expanded flanges at the opening or on the neck of the container engage complementary threading, a groove or slot in the cap. The screw capping operation in automated systems involves engaging the complementary threading or the slot in the cap with the flanges and rotating the cap until it is snugged against the container at a preselected torque.

Automated capping systems such as the KAPS-ALL® packaging systems, generally use a pair of side belts to capture the puck during the capping operation. These systems may experience some slippage problems in capturing and holding currently available cylindrical pucks. In addition, these systems are not well-suited to receiving or handling irregularly shaped containers such as the triangular bottles used for some popular liquid medications. In particular, the triangular, oval and other non-cylindrical containers tend to be difficult to align and introduce into a container carrier. They also tend to rotate within the carrier during the capping operation. Missed container insertion (no container), slippage and internal rotation can each trigger shut down of the assembly line and result in product waste.

Movement of the container carriers through such automated systems can generate substantial noise. The carriers are generally constructed of a hard synthetic resin material so that they will be durable and can be easily cleaned and sterilized if product spillage occurs. The container carriers are accumulated for use in an accumulating or staging area, where collisions between their hard surfaces produce noise. Some systems employ a vibratory mechanism to align and move the carriers along, which causes them to slap against each other. Some systems employ one or more pneumatic cylinders to push the carriers to various stations along the production line. Such cylinders strike the external surface of the carrier, causing noise. The carriers also generate noise when they transition from one conveyor to another, as well as along the production line when they collide as they are stopped for filling or other operations. High volume automated bottling and packaging systems employ extremely large number of container carriers, which may generate unacceptable levels of occupational noise exposure for their workers.

Container carriers are frequently designed to accommodate more than one size or type of container. This reduces the need for additional carriers and minimizes changeover time for dispensing different products on the same line. However, taller product containers have a higher center of gravity, which subjects them to tipping when filled with liquids or other heavier products.

Accordingly, there is a need for an improved product container carrier that enables a container to be easily loaded into a carrier, that centers the container on the vertical axis of the carrier, that prevents rotation of the container within the carrier, that enables a capper to capture the carrier and prevent slippage or rotation of the carrier, as well as the product container, during cap placement and torque down, that includes effective noise damping features, and that can be configured with a selected weight distribution to accommodate product containers having any of various shapes and weights so as to maintain the product container in an upright position during an automated filling and capping operation.

SUMMARY

An improved product container carrier includes a radially expanded base and an upstanding container holder with a recess for receiving a container. The external surface of the carrier includes a series of abutment surfaces to facilitate gripping the carrier and holding it in place. The internal surface of the container holder includes a plurality of abutment surfaces to facilitate loading and gripping of the container. A plurality of beveled surfaces assist in guiding the container into position at the center of the carrier and into contact with the abutment surfaces.

The carrier may also include a data element such as an RFID tag and/or bar coding. The base and the container holder may be constructed separately and secured together, or they may be of unitary construction. The base may include one or more recesses for receiving the container holder and/or data element.

In one embodiment, the carrier includes a housing module, a bumper and a base. The housing module may include a platform member that supports a product holder. A plurality of lugs depend from the platform member for reception within apertures in the bumper and bottom cap to receive fasteners that join the components together. In one aspect, the bottom cap is recessed to include a data element and a weight, and the bumper is recessed to include a weight. In another aspect, a data element and a weight are formed into the bottom cap and a weight is formed into the bumper.

The housing module may include a holder having a plurality of container abutment surfaces and angled surfaces at the opening to guide a container into engagement with the abutments.

The housing module may include a holder having a plurality of spaced container abutment surfaces. The abutment surfaces are separated by relief vents to enable air to escape when the carrier receives a container within the holder.

The housing module may include a holder having a pair of upright support members, which may be supported by a connecting base. Lateral openings between the upright supports permit engagement of the exposed side areas of the container by belts or other means.

A housing module may be selected in accordance with the type of container to be carried. The housing module is connected with the bumper and base by structure that extends between the housing and the base and passes through apertures in the bumper. This structure secures the parts of the carrier together. The bumper and the base may each include a weight positioned at a location selected to raise or lower the center of gravity to uphold the filled container within the carrier.

Various objects and advantages of this product container carrier will become apparent from the following description taken in conjunction with the accompanying drawings wherein are set forth, by way of illustration and example, certain embodiments of this container carrier.

The drawings constitute a part of this specification, include exemplary embodiments of the carrier, and illustrate various objects and features thereof.

DETAILED DESCRIPTION

As required, detailed embodiments of the product container carrier are disclosed herein; however, it is to be understood that the disclosed embodiments are merely exemplary of the device, which may be embodied in various forms. Therefore, specific structural and functional details disclosed herein are not to be interpreted as limiting, but merely as a basis for the claims and as a representative basis for teaching one skilled in the art to variously employ the apparatus in virtually any appropriately detailed structure.

Figure 1:
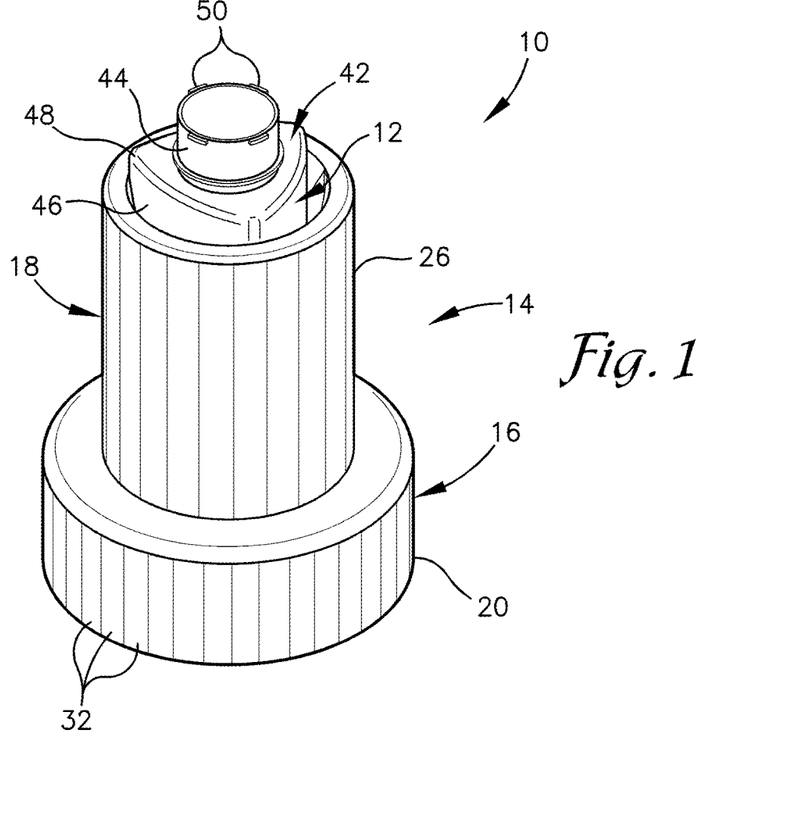
FIG. 1 is a perspective view of a product container carrier with a triangular-type container in place.

Referring now to the drawing figures, an exemplary product container carrier 10 is illustrated in FIG. 1 in association with an exemplary container 12. The carrier 10 includes a housing 14 having a base 16 supporting a container holder or sleeve 18.

Figure 4:
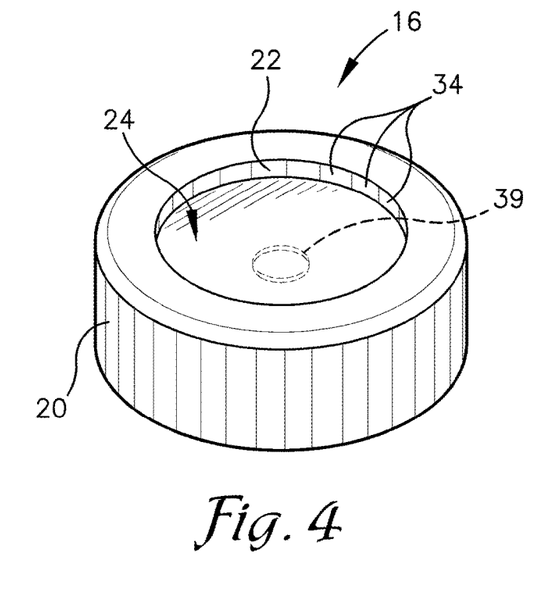
FIG. 4 is a perspective view of the base shown in FIG. 1.
Figure 5:
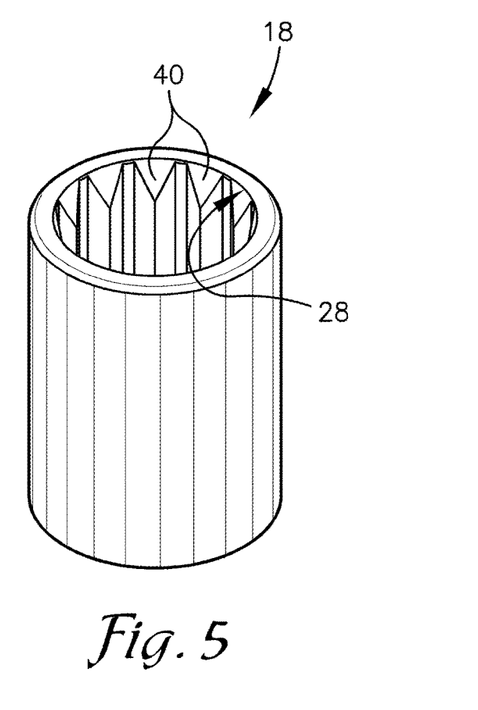
FIG. 5 is a perspective view of the sleeve shown in FIG. 1.
Figure 6:
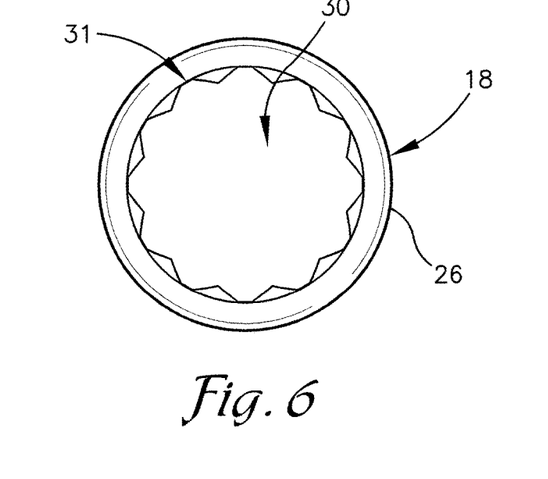
FIG. 6 is a top plan view of the sleeve of FIG. 3 with the container removed.

As best shown in FIGS. 4 and 5, the base 16 has an approximately cylindrical external overall shape presenting an external sidewall 20. A shorter internal sidewall 22 is positioned in axial spaced relation to the external sidewall. The internal sidewall 22 circumscribes an aperture, cavity or recess 24 in the base for receiving the sleeve 18. The sleeve 18 has an approximately cylindrical external overall shape that is generally more elongate than the base and includes an external sidewall 26 and a coaxial internal sidewall 28. The sleeve internal sidewall 28 circumscribes a bore, cavity or recess 30 for receiving a container 12 through an upper opening 31 (FIG. 6). While the base and sleeve are each illustrated to have an approximately cylindrical external overall shape, any suitable external shape may be employed, including generally multilateral, oval, or multi-curved or combinations thereof. It is also foreseen that the base 16 and sleeve 18 may have the same outer diameter and/or surface configuration as, for example, a cylinder or oval, so that delineation of the base is not apparent from the external geometry of the carrier 10. It is further foreseen that the carrier 10 may be constructed as if bored through, so that the sleeve 18 is contiguous with the base 16. The sleeve 18 and base 16 may be constructed as separate pieces, or they may be of unitary construction.

The surfaces of the external and internal sidewalls 20 and 22 of the base 16 each include a series of respective abutment or gripping surfaces 32 and 34. The surface of the external sidewall 26 of the sleeve 18 also includes a series of abutment surfaces 36. The abutment surfaces 32, 34 and 36 are depicted in the drawing figures as generally vertically oriented flattened surfaces. It is foreseen that these surfaces may also be knurled, swaged, crenate, scalloped or configured in any other suitable manner or combination of manners to provide the sidewalls 20, 22 and 26 with a series of gripping surfaces. Where the sleeve 18 and base 16 are constructed as separate components, the respective external and internal abutment surfaces 36 and 34 of the sleeve and base aid in mutual engagement and gripping of the surfaces. This provides a friction fit for seating and holding the sleeve 18 in the recess 24 of the base during use, and also allows for quick and easy manual disengagement of the parts. Such construction enables substitution of different sleeve and base components or modules. It is also foreseen that the base internal sidewall 22 may be configured to include a smooth surface to facilitate application of an adhesive substance for permanently securing the sleeve 18 in the recess 24.

Figure 3:
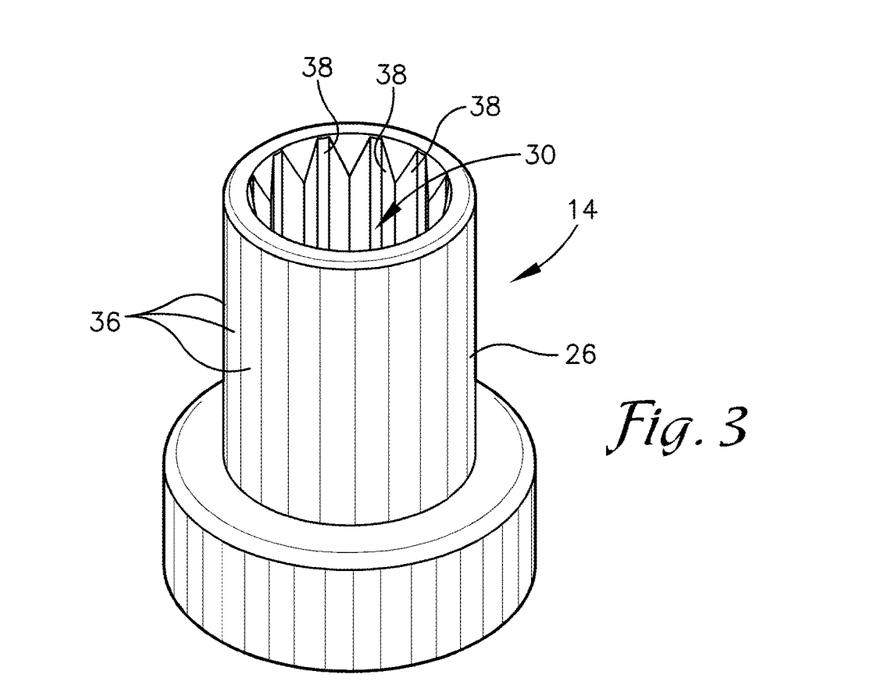
FIG. 3 is a perspective view of the product container carrier of FIG. 1 with the container removed.

The surface of the sleeve internal sidewall 28 includes a series of container abutment or gripping surfaces 38. Preferably, the surfaces 38 are broached, molded, swaged or otherwise configured to provide a series of internal grooves that serve to position the container 12 at the center of the sleeve 18 and prevent slippage and/or rotation. The grooves are generally axially oriented and distributed so as to provide a plurality of container-contacting surfaces. In one example, the grooves are generally evenly distributed along the sleeve inner sidewall 28. As best shown in FIGS. 3 and 5, the upper portion of the surfaces 38 may also include a series of bevels or chamfers 40 that are angled inwardly and serve to facilitate or ease the entry of the container 12 through the opening 31 and into the center of the sleeve 18. It is also foreseen that the surfaces 38 may have a configuration similar to surfaces 32, 34 and 36. The container abutment surfaces 38 may be of integral construction with the sleeve 18, or they may be independently formed as a bushing or insert, which may be removable or secured in place. Independently formed abutment surfaces may be constructed from a resilient material such as a silicone polymer or other suitable composition. The abutment surfaces 38 may also take the form of a smooth-walled tubular insert or bushing constructed of a resilient material. In such construction, the resiliency of the material would enable the insert to engage the container surface(s). The insert or bushing may be removable, or it may be secured in place by an adhesive composition or fasteners.

Figure 2:
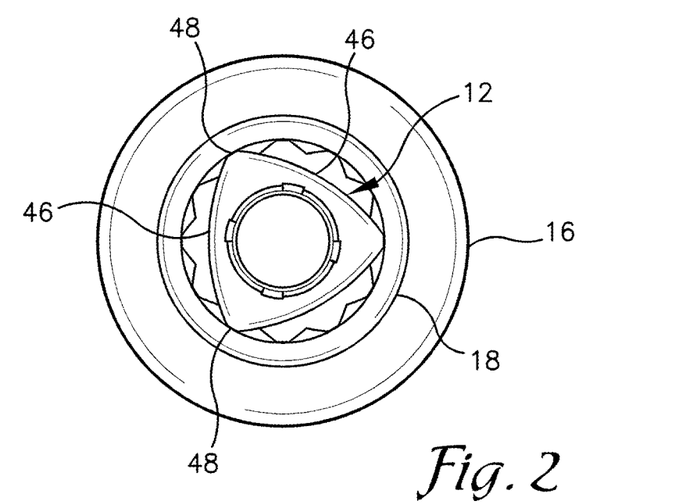
FIG. 2 is a top plan view of the sleeve of FIG. 1 with a product container carrier in place of FIG. 1.

As shown in FIGS. 1 and 2, the exemplary container has a body 42, including an upstanding neck 44, which may be tapered. The body 42 includes three walls 46 that meet at acute angles to form corners 48, imparting a generally triangular shape when viewed from above. The upper portion of the neck 44 includes a plurality of outstanding flanges 50 for reception within corresponding tracks or grooves in a cap. The abutment surfaces 38 on the sleeve internal sidewall 28 receive the container corners 48 and grip them in place when a cap is inserted over the container neck and rotated to engage the flanges 50. This construction prevents the container from rotating within the sleeve 18 along with the cap as it is tightened to a predetermined torque. While the exemplary container described and shown in FIGS. 1 and 2 presents a generally triangular cross section, it is foreseen that the product container carrier 10 can be used to prevent rotation within the carrier of a container having virtually any construction capable of engagement by the abutment surfaces 38. It is also foreseen that the angular orientation of the abutment surfaces 38 may be specially configured to maximize gripping contact with the sidewalls of virtually any container.

Any of the previously described components of the container carrier 10 may be constructed of any known or hereafter developed synthetic resin, rubber, metal or other suitable material or combination thereof. The carrier components may be of solid construction, or they may be generally or partially hollow with internal support ribs. A nonslip coating composition may be applied to any or all of the abutment surfaces 32, 34, 36, 38 to facilitate gripping.

In a method of manufacture of the container carrier 10, the base 16 and sleeve 18 are constructed separately. The base 16 is constructed so that the internal sidewall 22 and recess 24 are axially oriented in the base. A data element such as an RFID unit 39 may be molded in or otherwise installed in the base 16, either in the recess 24 or any other suitable location, or in the sleeve 18. An adhesive substance such as, for example, a glue, epoxy, fusion weld are applied to one or more of the bottom surface of the sleeve 18 the lower portion of the sleeve exterior sidewall 26, the base internal sidewall 22 and the portion of the base recess 24 adjacent the internal sidewall 22. The base and sleeve are connected by sliding the sleeve 18 into the recess 24 in a press fit. The puck 10 may be constructed of a synthetic resin material or any other suitable material, including but not limited to a metal or organic material.

Alternatively, the base 16 and sleeve 18 may be of unitary construction with the sleeve 18 positioned coaxial on the base 16. A data unit 39 may be installed on or in the base portion 16 or on or in the sleeve 18.

Figure 8:
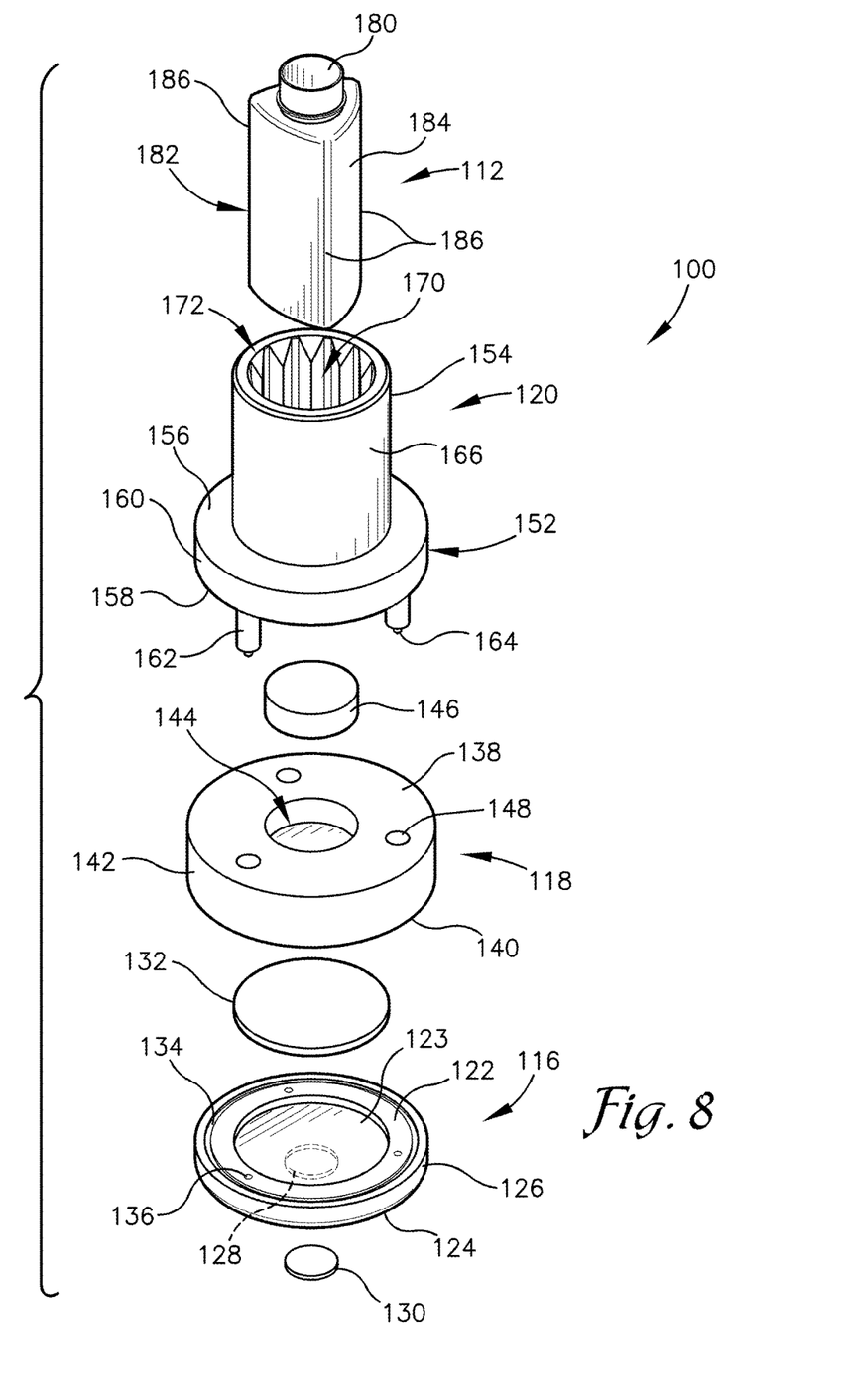
FIG. 8 is an exploded perspective view of an embodiment of a product container carrier with triangular container.
Figure 9:
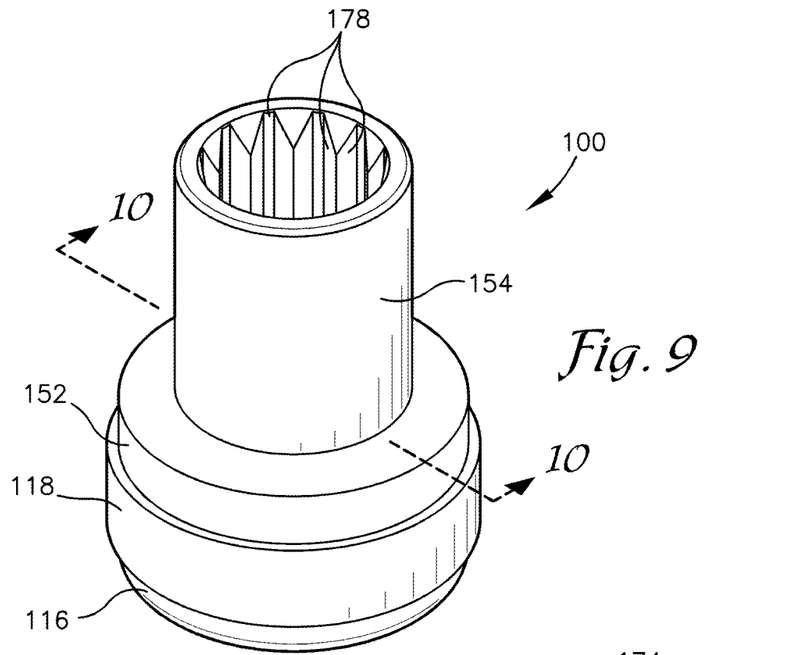
FIG. 9 is a perspective view of the product container carrier of FIG. 8 with the container removed.
Figure 10:
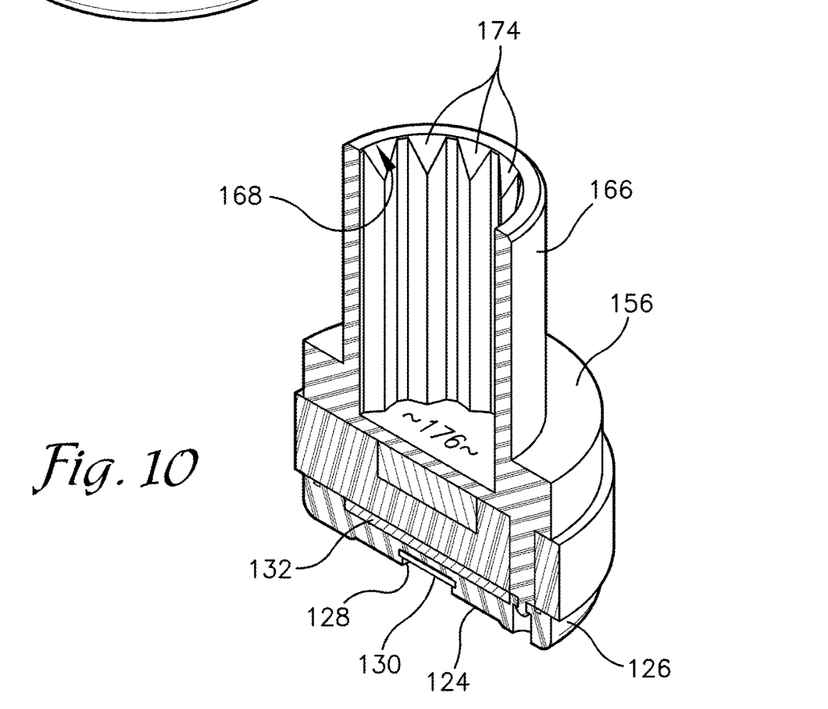
FIG. 10 is a sectional view taken along line 10-10 of FIG. 9.

In another embodiment shown in FIGS. 8-10, a modular container carrier includes a noise-damping base with a variety of selectable container housing modules designed to accommodate various types of containers. An exemplary product container carrier 100 is illustrated in FIG. 8 in association with an exemplary container 112. The container carrier 100 includes a base or bottom cap 116 supporting a bumper element 118, and a housing module 120.

The base 116 is approximately disc-shaped, with an upper or top surface 122, a lower or bottom surface 124 and a circumscribing sidewall 126. The lower surface 124 may be substantially planar, or it may include a recess 128 to receive a data element 130, which may also be molded in place during formation of the base 116. Optically readable data may also be inscribed on or applied to the base sidewall 126 or to the sleeve sidewall 166. A weight unit or element 132 is molded into a recess 123 in the upper surface 122 of the base. The weight 132 may also rest or be attached to the upper surface 122 so that it is captured between the base upper surface 122 and the bumper 118. The weight may be constructed of a metal, such as lead, steel or other ferrous metal, aluminum, or any other suitable material. It may be in the shape of a disc, as shown in FIG. 8, or it may have any other suitable configuration, such as an apertured washer or multilateral body. Multiple weight elements may also be arranged in axial spaced relation or in axial and vertical spaced relation. The upper surface 122 includes an axial expansion groove 134 to facilitate snugging the upper surface of the base 122 against the lower surface of the bumper. The base 116 includes a plurality of spaced apertures to receive fastener structure for connecting the base, bumper and housing module, as will be described.

The bumper 118 includes upper and lower surfaces 138, 140 and a sidewall 142. A central recess 144 is provided adjacent either the upper or lower surface or at the center to receive a weight unit 146, which may be molded into the bumper. The bumper 118 also includes a plurality of spaced apertures 148 for receiving connecting structure therethrough. The apertures 148 are positioned for alignment with the corresponding apertures 136 in the base. The bumper is sized to have a diameter greater than that of the base 116 as well as the housing module 120, so that it is outstanding from the carrier 100. The bumper is constructed of a resilient material such as rubber or a synthetic resin, so that it will cushion the impact of a collision with another object such as the bumper of another container carrier, the guide rails 194 or other portion of the conveyor system 188, or any other equipment or materials encountered along the production line. By cushioning such impacts, the noise usually associated with impact is damped, resulting in a quieter production line.

The housing module 120 may be variously configured, but generally includes a platform 152 supporting a container holder, which may be in the form of a support sleeve 154. The platform 152 includes an upper surface 156, lower surface 158 and sidewall 160. A plurality of support structures, legs or lugs 162 depend from the platform lower surface 158. The lugs 162 are sized and positioned for alignment with the bumper apertures 148. Each lug terminates in a stud or pin 164. The pins 164 are undersized to enable a slip fit in the base apertures 136. The arrangement of the supports 162 may be reversed, so that the apertures 136 are positioned in the platform 152, rather than the base 116 and the legs 162 extend upwardly from the base 116 for registry with apertures 136 in the platform 152.

In one aspect, the container support sleeve 154 of the upper housing module 120 is substantially as previously described, including an external sidewall 166 and a coaxial internal sidewall 168 circumscribing a recess or bore having an opening 172 at its upper end for receiving the container 112. The internal sidewall 168 includes a series of abutment surfaces 178 and a series of bevels or chamfers 174 adjacent the opening 172. A similarly configured bushing may be used. The lower end of the recess 170 terminates at a generally planar container support surface 176 positioned between the platform upper and lower surfaces 156 and 158. The surface 176 may also be positioned on a level with either of the platform upper or lower surfaces 156 and 158. The sleeve internal sidewall includes a plurality of container abutment surfaces 178 as previously described.

An exemplary container 112 is shown in FIG. 8 with a cap 180 installed. The container is substantially as previously described, and includes a body 182 having a flanged or threaded neck (not shown) and three walls 184 that meet at angles to form corners 186.

When the container 112 is filled with a heavy product, the carrier unit 100 with filled container 112 may become top-heavy and likelihood of tipping the container and spilling the product may be increased. Such likelihood is substantially increased in the case of taller narrow containers such as shampoo bottles. Advantageously, the weight distribution of the container carrier 100 may be adjusted to raise or lower the center of gravity of the carrier to accommodate a particular type of product. This may be accomplished by raising or lowering the positions of one or more of the weights 132 and 146 and/or the weighted bumper 118 in the carrier until the center of gravity is positioned for maximum efficiency. The bumper 118 and base 116 may also be constructed to have taller sidewalls 142 and 126, allowing greater flexibility in vertically positioning the respective weights 146 and 132. In another aspect, a weight unit may be constructed to include a central aperture sized for installation over the sleeve 154, to rest on the upper surface 156 of the platform 152. Such a weight unit may be an additional weight (not shown), or one or both of weight units 132 and 146 may be constructed to include a central aperture and repositioned in this manner.

In a method of manufacture of the container carrier 100, the base 116, bumper 118 and housing 120 are constructed separately. In the exemplary embodiment shown, the platform 152 and sleeve 154 are depicted as being of unitary construction. However, it is foreseen that they may also be constructed separately. A data element 130 and weight 132 are molded in or otherwise installed in respective recesses 128, 123 in the base 116. A weight 146 is molded in or otherwise installed in puck recess 144. The parts of the container carrier 100 are assembled and fastened together using thermoplastic or heat staking. The base 116, bumper 118 and housing module 120 are aligned and assembled so that the lugs 162 project through the bumper apertures 148 and the pins 164 project through the base apertures 136. In the reversed configuration previously described, the lugs 162 project from the base 116, through the bumper apertures 148 and the pins 164 project through the platform 152. Heat and pressure are then applied to deform the pins 164 to form a rivet-type head on the lower surface 124 of the base, or alternately, on the upper surface 156 of the platform. Heat staking is particularly well-suited to fasten the parts together in close relation; however conventional fasteners may also be employed.

Removable fasteners such as screws (not shown) or any other suitable fastener element may be used to enable substitution of alternate housing modules 120 and bases 116 to accommodate a variety container types. Where conventional fasteners are used, the pins 164 may be omitted and the fasteners project upwardly through the base apertures 136 for reception into the lugs 162 from below. Alternately, the fasteners project downwardly through the platform apertures for reception into the lugs 162 from above. In another aspect, the pins and the lugs may both be omitted and the fasteners project upwardly through the base apertures 136 and into the platform 156 or downwardly through the platform apertures into the base 116. While three fasteners are shown in the drawing figures, any suitable number may be employed, including a single fastener. It is also foreseen that an adhesive substance, either alone or in combination with other fasteners, may be employed to fasten the parts together.

Figures 11, 12:
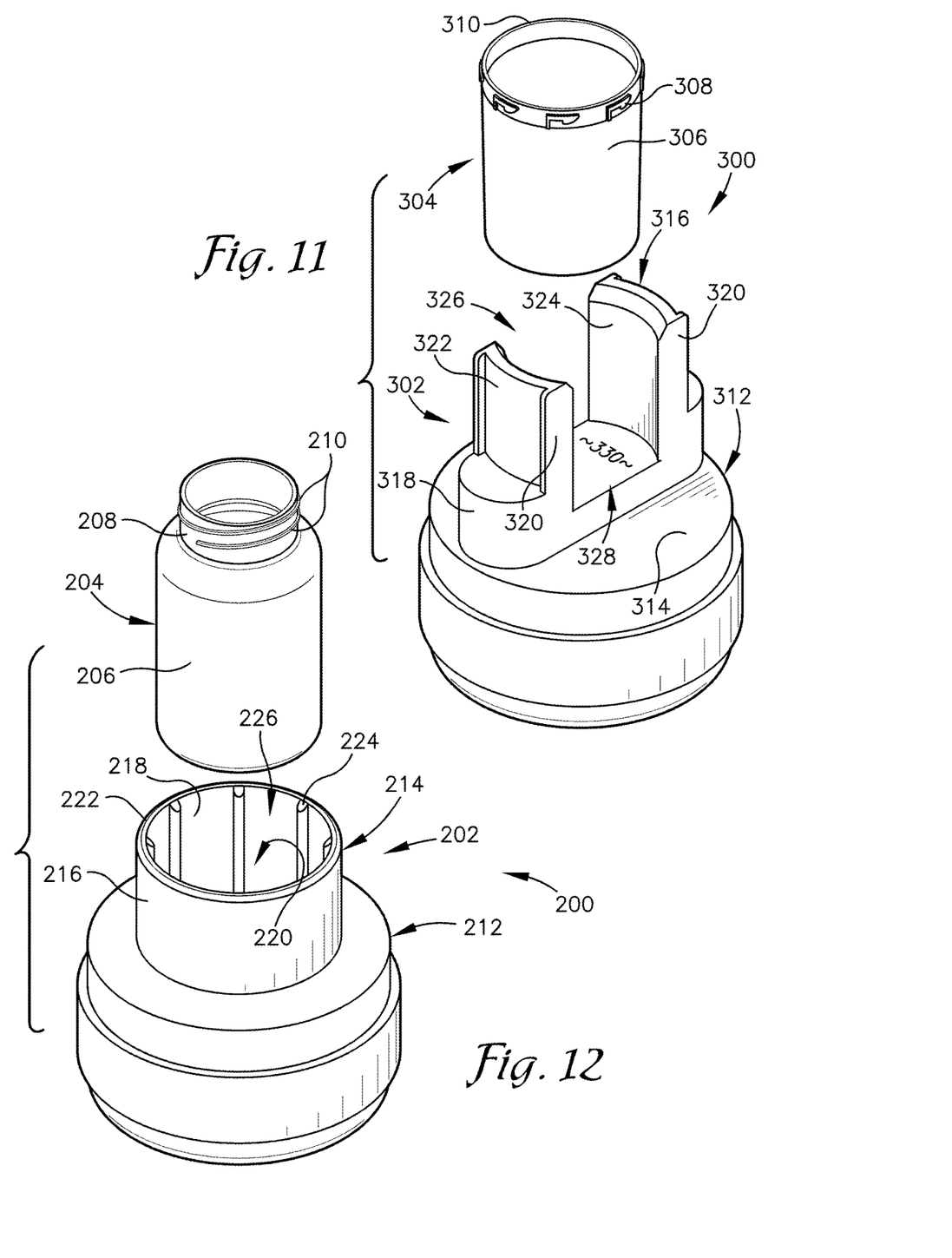
FIG. 11 is a perspective view of an exemplary product container carrier with upright support members, showing a container in position for reception within the carrier.
FIG. 12 is a perspective view of an exemplary product container carrier with spaced interior abutment surfaces forming relief vents, showing a container in position for reception within the carrier.

FIG. 12 illustrates an exemplary container carrier 200 having a housing module 202 designed to receive and transport a generally cylindrical container 204 having a circumscribing sidewall 206. While the housing module 202 is designed to support any generally cylindrical or other container having a generally circular cross section, the illustrated exemplary container also includes a concentric upstanding neck 208 including threads 210. The housing module 202 includes a platform 212 as previously described supporting a container support sleeve 214. The sleeve includes an external sidewall 216 and a coaxial internal sidewall 218 circumscribing a recess or bore 220 having an opening 222 at its upper end for receiving the container 204. The external sidewall 216 may include a plurality of abutment surfaces as previously described or a similarly configured bushing may be employed. The recess 220 may also include a smaller opening or drainage hole at its lower end. As shown in FIG. 12, the sleeve 214 may be designed so that the sidewalls 216 and 218 are shortened to allow a greater portion of the container 204 to project above the sidewalls for engagement with container handling structure such as a side belt.

The internal sidewall 218 includes a plurality of spaced abutment members 224, in the form of ribs, ridges, or other vertically oriented structures for engaging the container sidewall 206. The ribs 224, the sleeve internal sidewall 218, and the container sidewall 206 cooperate to form a series of circumferential spaces or vents 226 between the sidewall of the container 204 and the sleeve. The relief vents 226 enable air to escape as the container 204 is introduced into the recess 220, reducing back pressure on the container 204 as it is loaded and thus speeding the carrier loading process. The method of manufacture of the container carrier 200 is as previously described.

FIG. 11 illustrates an exemplary container carrier 300 having a housing module 302 configured to receive and transport a container 304 having a sidewall 306. While the housing module 302 is designed to support a container having virtually any shape, the illustrated exemplary container is a cylindrical vial having a plurality of spaced apart lugs 308 adjacent an upper opening 310. The housing module 302 includes a platform 312, having an upper surface 314. The platform 312 supports a container holder 316. The holder includes a base 318 supporting a pair of upright support members or posts 320. The posts are positioned in spaced relation equidistant from the central vertical axis of the carrier, with the distance between them selected to accommodate the diameter or width of the container 304. The posts 320 each include an exterior sidewall 322 and an interior sidewall 324. The interior sidewalls 324 of the posts cooperatively form a container receiving area 326 having a pair of opposed side openings 328 extending from a lower container support surface 330 to the tops of the posts 320. It is foreseen that the base 318 may be omitted, and the posts 320 connected directly to the platform 312, which in this aspect also serves as the container support surface 330. One or more of the posts 320 may also include structure providing lateral adjustability so that the posts may be adjusted to receive larger or smaller containers. In one aspect, the interior sidewalls 324 or a portion thereof may include a resilient compressible collar adjacent the opening or bushings on the interior sidewalls 324. The bushings are compressed by the container sidewalls 306 when the container is introduced into the carrier 300. The compressed bushings push against the container sidewalls 306, providing lateral support to containers 304 that are too small to engage the interior sidewalls 324.

As shown in FIG. 11, the container holder 316 is designed so that opposed portions of the generally cylindrical container sidewall 306 will extend radially outwardly beyond the uprights 320 for engagement with container handling structure such as a side belt or star wheel. In addition, the full length of the opposed portions that extend radially outwardly will be exposed, for example, for optical reading of a label, bar code, or the like.

A modular container carrier system includes a base 116, bumper 118, weights 132 and 146, data element 130 and housing modules 14, 120, 202 and 302. Bases 116 and bumpers 118 are provided having the weight 146 positioned in the middle or adjacent the bumper upper or lower surface, 138 or 140. A carrier is assembled by selecting a base and bumper 118 having a weight distribution selected to provide sufficient ballast for the filled container. A housing module is selected based on the type of container to be filled. The base, weight 132, bumper with weight 146 and lugs 162 of the housing module 14, 120, 202 or 302 are aligned and assembled as previously described. The parts may be fastened together using heat staking or a removable fastener. An additional weight may be installed by aligning a central aperture over the holder element 154, 214, or 316 and sliding the weight downwardly until it contacts the upper surface of the platform or base 318. The resultant carrier may be subsequently disassembled and reassembled using a different base, housing module or vertical positioning of the weights to enable use of the carrier with a different type of container as well as distribution of the weight of the carrier in accordance with the shape of the container and weight of the filled product.

Figure 7:
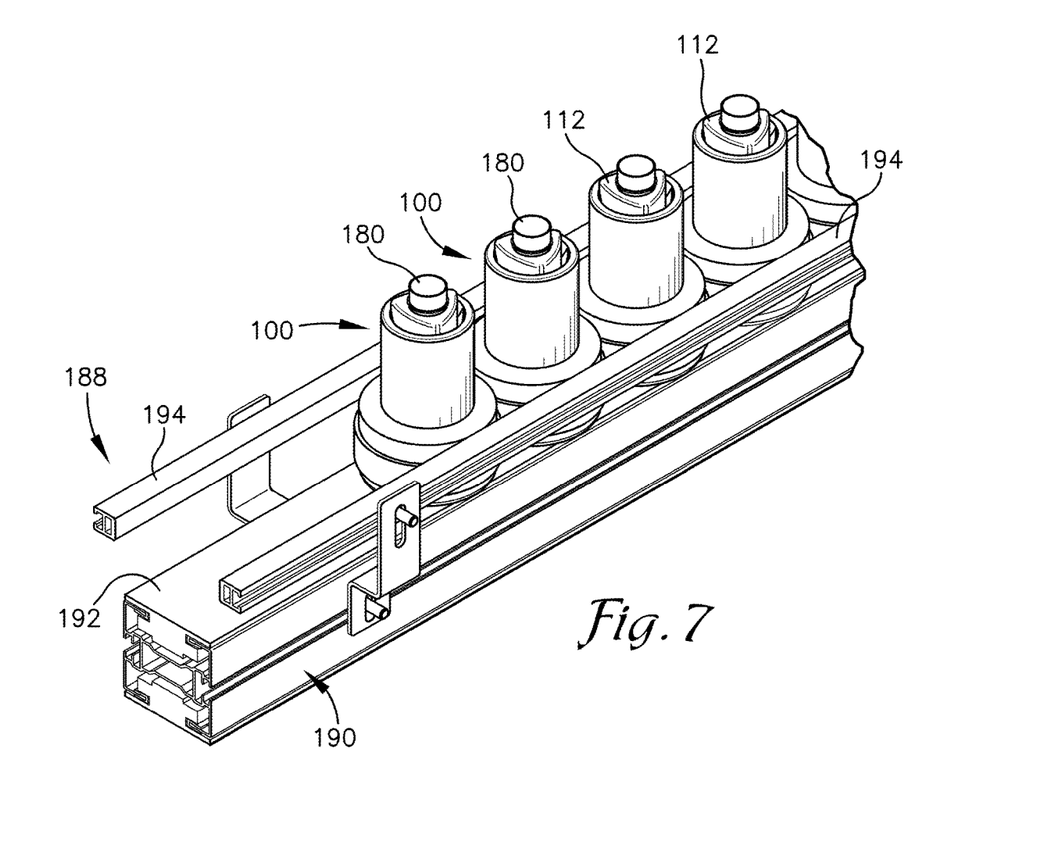
FIG. 7 is a perspective view of product container carriers including a bumper shown in line formation on a production line conveyor.

FIG. 7 illustrates a plurality of exemplary container carriers 100 loaded onto a portion of a packaging system conveyor 188. The conveyor includes a frame 190 having an endless conveyor or bottom belt 192, which serves as a load-supporting surface. The belt 192 transports the carriers along a predetermined path through an assembly or production line to be filled, capped and labeled. The frame 190 includes a pair of opposed guide rails 194, which are adjusted to a selected spaced distance to accommodate the width of the carriers 100 and maintain them in centered relation on the belt 192 as it travels over the frame 190. Such conveyor systems also generally include one or more pairs of bottle gripper or side belts (not shown) for use with tall or unstable containers or tall container carriers 100.

In use, a quantity of container carriers 100 is loaded onto a conveyor belt 192 with their container holders in an upward-facing orientation for transport along the production line. The carriers may be accumulated on an accumulating table, so-called "puck pond" or similar area awaiting production line demand, and shunted onto another conveyor for transport to the next station. The carriers may be pushed by mechanical means to urge them into position and jostle each other during transport. Advantageously, the outstanding bumpers 118 prevent the platform sidewalls 160 and bases 116 of the carriers 100 from making noise-generating contact with the hard sidewalls and bases of adjacent carriers. Instead, when the carriers 100 collide, the resilient bumpers 118 contact each other, absorbing the force of the collision and damping any noise.

A container 112 is typically dropped by a loading component of the packaging system into the sleeve portion 154 of the housing module 120 of each carrier 100. The bevels 174 serve to introduce the container 112 into the container carrier 100 and guide it into contact with the container abutment surfaces 178, which cooperate to center the container 112 in the carrier with the mouth or opening centered along the central vertical axis of the carrier 100. While the container 112 is illustrated in FIGS. 1 and 8 as a generally triangular shaped bottle, it may have any suitable three dimensional shape and need not be symmetrical along any axis.

For example, the container may present multiple planar surfaces such as a solid rectangular, square, star-shaped or irregular container. It may also present single or multiple curved surfaces, such as a cylinder, oval, heart shape or irregularly curved container. It may also present a combination of planar and curved surfaces.

The carrier 100 and container 112 proceed along the conveyor to at least a station where the container is filled with one or more preselected products. Preferably, the package handling system also includes a series of scanning and verifying stations where the data unit in the carrier is read and compared with a bar code on the container 112. The filled container 112 is then transported in its carrier 100 to a capping station where a cap 180 is positioned on the container to engage a fastening member such as a flange 50 (FIG. 1). While the fastening member is illustrated in FIG. 1 to include a plurality of radially expanded flanges 50, it may include threading, a continuous circumferential rib or any other suitable fastening means.

Typically, the capping station employs side belts or a rotary assembly such as a star wheel, or other structure to engage the housing module 120 or the container. Side belts capture the carrier 100 against rotation and position it so that the container opening is centered under the cap. Where the sleeve 18 is configured to include abutment surfaces 36 as shown in FIG. 1, they provide additional areas of belt-to-carrier or wheel-to-carrier contact that assist in securing the carrier against rotation. Where the housing module 202 is configured to allow the container 204 to project above the sleeve 214 as shown in FIG. 12, the side belts or star wheel engage the free surface of the container sidewall 206 rather than the carrier. Where the housing module 302 is configured to allow the container 304 to project outwardly from the container holder 316, the belts or wheels engage the free sides of the container 304 rather than the carrier 300.

The internal abutment surfaces 178 of the sleeve 154 (FIG. 9) provide a series of seating surfaces for the container 112 that grasp or grip the container corners 186 (FIG. 8) and hold the container in place. Where the container is shaped other than as depicted, the abutment surfaces 178 grip the edges, protrusions, or any other suitable grippable portions of the container. Thus securely seated within the carrier 100, rotation or spinning of the container 112 is prevented during the capping operation. The container 112 remains stationary and coaxial with a central vertical axis of the carrier 100 while capping structure positions the cap 180 over the flanges 50, rotates the cap into mating engagement with flanges and snugs the cap in place on the container 112 to a preselected torque. Once filled and capped the conveyor belt 192 transports the container 112 past any additional scanning and verifying stations onto an order accumulation lane, which brings together multiple orders. In the case of a single component order, the container is then transported to a packing station for final packaging and/or delivery. In the case of a multi-component order, the container is deposited into a tote for further processing.

It is to be understood that while certain forms of the product container carrier have been illustrated and described herein, it is not to be limited to the specific forms or arrangement of parts described and shown.

The following is claimed:

1. A carrier for receiving a container and supporting the container during an automated filling and capping operation, the carrier comprising:
   a. a housing comprising a container holder and a platform, the container holder comprising an exterior sidewall, an interior sidewall, a container receiving area formed by the interior sidewall for supporting the container in coaxial alignment with a central vertical axis of the carrier, and an upper opening for receiving the container into the container receiving area, the platform comprising an upper surface, a planar lower surface, a sidewall extending between the upper surface and the planar lower surface, and a first projection extending away from the planar lower surface, the upper surface of the platform coupled to the container holder, the upper opening of the container holder being opposite the planar lower surface of the platform, the planar lower surface being bounded by a circular perimeter;
   b. a cylindrical bumper comprising a planar upper surface bounded by an upper perimeter in a shape of a circle, a lower surface bounded by a lower perimeter in the shape of the circle, a curved sidewall extending from the upper perimeter to the lower perimeter, a central cylindrical recess defined in the planar upper surface, and a first aperture configured to receive the first projection in surrounding relation therein when the planar upper surface of the cylindrical bumper abuts the planar lower surface of the platform, the first aperture extending through the cylindrical bumper from the planar upper surface to the lower surface and being spaced apart from the central vertical axis when the first projection is received within the first aperture, the central cylindrical recess comprising a curved inner sidewall and an inner bottom surface spaced apart from the lower surface of the cylindrical bumper, the central cylindrical recess configured to receive a cylindrical weight therein, the central cylindrical recess being coaxially aligned with the central vertical axis when the cylindrical bumper is positioned between the base and the housing; and
   c. a base having an upper surface configured to abut the lower surface of the cylindrical bumper, the first projection configured to couple to the base such that the cylindrical bumper is positioned coaxially with the central axis and between the base and the housing.

2. The carrier of claim 1, wherein the interior sidewall of the housing comprises a plurality of container abutment surfaces and a plurality of guide surfaces, the plurality of container abutment surfaces configured to contact sides of the container when the container is positioned within the container receiving area, the plurality of guide surfaces positioned near the upper opening and angled to guide the container into engagement with the plurality of container abutment surfaces.

3. The carrier of claim 1, wherein the first aperture comprises a cylindrical through-hole, and the first projection comprises a cylindrical member having a vertical axis that is parallel to and offset from the central vertical axis of the carrier.

4. The carrier of claim 1, wherein a diameter of the platform is greater than a diameter of the container holder.

5. The carrier of claim 1, wherein a diameter of the platform or the container holder is less than a diameter of the cylindrical bumper.

6. The carrier of claim 1, wherein the cylindrical bumper is restrained from rotating via the first projection being received within the first aperture.

7. The carrier of claim 1, wherein the first projection extends through the cylindrical bumper and beyond the lower surface of the bumper to connect the platform to the base when the planar upper surface of the cylindrical bumper abuts the planar lower surface of the platform.

8. The carrier of claim 1, wherein at least a portion of the interior sidewall is cylindrical in shape.

9. The carrier of claim 1, wherein the container holder comprises a tube comprising the exterior sidewall and the interior sidewall.

10. The carrier of claim 1, wherein the platform further comprises a second projection extending away from the planar lower surface, and the cylindrical bumper comprises a second aperture spaced apart from the central vertical axis and configured to receive the second projection in surrounding relation therein when the planar upper surface of the cylindrical bumper abuts the planar lower surface of the platform.

11. The carrier of claim 10, wherein the first projection is offset from the central vertical axis on the planar lower surface of the platform, and the second projection is offset from the central vertical axis on the planar lower surface of the platform.

12. The carrier of claim 11, wherein the platform further comprises a third projection extending away from the planar lower surface, the third projection being offset from the central vertical axis on the planar lower surface of the platform, and wherein the cylindrical bumper comprises a third aperture spaced apart from the central vertical axis and configured to receive the third projection in surrounding relation therein when the planar upper surface of the cylindrical bumper abuts the planar lower surface of the platform.

13. The carrier of claim 1, wherein the first aperture is spaced apart from the central cylindrical recess.

14. The carrier of claim 1, wherein the first projection is configured to slip-fit into the first aperture.

15. The carrier of claim 1, wherein the container holder comprises a pair of upright supports.

16. The carrier of claim 15, wherein the pair of upright supports comprise the exterior sidewall, and the interior sidewall.

17. The carrier of claim 15, wherein the pair of upright supports defines a pair of opposed side openings.

18. The carrier of claim 1, wherein the housing, the cylindrical bumper, and the base are separate components of the carrier that are configured to be assembled together in a stacked arrangement.

19. The carrier of claim 1, further comprising the cylindrical weight comprising a flat top surface, a flat bottom surface, and a curved sidewall extending from the flat top surface to the flat bottom surface, each of the flat top surface and the flat bottom surface being bounded by a circular perimeter, wherein, when the cylindrical weight is positioned within the central cylindrical recess such that the flat bottom surface of the cylindrical weight abuts the inner bottom surface of the central cylindrical recess, the flat top surface of the cylindrical weight is generally coplanar with the planar upper surface of the cylindrical bumper.

20. The carrier of claim 1, wherein the circular perimeter of the platform defines a platform diameter, and the upper circular perimeter of the cylindrical bumper defines a bumper diameter, the bumper diameter being larger than the platform diameter.

21. The carrier of claim 1, wherein the upper and lower perimeters define a diameter of the cylindrical bumper that is greater than that of the base.

22. The carrier of claim 1, wherein the first projection terminates in a stud, and the base further comprises a base aperture defined in the upper surface and configured to receive the stud of the first projection therein when the first projection is received in the first aperture in surrounding relation therein.

23. The carrier of claim 22, wherein the stud terminates at a deformed end that projects past a bottom surface of the base and is prevented from retracting back through the base by the deformed end.

* * * * *